(12) United States Patent
Holzapfel et al.

(10) Patent No.: US 10,666,004 B2
(45) Date of Patent: May 26, 2020

(54) SLIPRING WITH REDUCED CONTACT NOISE

(71) Applicant: SCHLEIFRING GMBH, Fürstenfeldbruck (DE)

(72) Inventors: Christian Holzapfel, Fürstenfeldbruck (DE); Peter Heinbuch, Fürstenfeldbruck (DE); Sascha Christmann, Heubach-Lautern (DE); Michael Ritz, Bartholomae (DE)

(73) Assignee: SCHLEIFRING GMBH, Fürstenfeldbruck (DE)

(*) Notice: Subject to any disclaimer, the term of this patent is extended or adjusted under 35 U.S.C. 154(b) by 234 days.

(21) Appl. No.: 15/608,492

(22) Filed: May 30, 2017

(65) Prior Publication Data
US 2017/0346250 A1 Nov. 30, 2017

(30) Foreign Application Priority Data
May 30, 2016 (EP) .................................... 16172022

(51) Int. Cl.
*H01R 39/20* (2006.01)
*H01R 39/34* (2006.01)
(Continued)

(52) U.S. Cl.
CPC ............ *H01R 39/20* (2013.01); *H01R 39/34* (2013.01); *H02K 13/003* (2013.01); *H02K 13/02* (2013.01); *B32B 15/04* (2013.01)

(58) Field of Classification Search
None
See application file for complete search history.

(56) References Cited

U.S. PATENT DOCUMENTS

| | | | | |
|---|---|---|---|---|
| 2,956,190 A | * | 10/1960 | Heydenbluth | .......... B21F 45/00 29/597 |
| 4,181,582 A | * | 1/1980 | Dahms | ..................... C25D 3/38 205/296 |

(Continued)

FOREIGN PATENT DOCUMENTS

| | | |
|---|---|---|
| CN | 101696512 A | 4/2010 |
| EP | 2581473 A1 | 4/2013 |

(Continued)

OTHER PUBLICATIONS

Extended European Search Report issued in related European Application No. 16197807.7, dated May 26, 2017, 10 pages.

*Primary Examiner* — John J Figueroa
(74) *Attorney, Agent, or Firm* — Quarles & Brady LLP; Yakov Sidorin

(57) ABSTRACT

A method for manufacture of a gold-plated slipring contact, comprising steps of galvanic deposition of a copper layer on the electrically-conductive substrate; of a nickel and/or nickel phosphor layer on the copper layer; and of a gold layer on the nickel and/or nickel phosphor layer. While galvanically applying the copper layer on the substrate, the used galvanic bath explicitly does not include at least one of 3-carboxy-1-(phenylmethyl)pyridinium chloride sodium salt, cationic polymers with urea groups, 1-(3-sulfopropyl) pyridinium betaine, 1-(2-hydroxy-3-sulfopropyl)-pyridinium betaine, propargyl(3-sulfopropyl)ether sodium salt, sodium saccharin, sodium allylsulfonate, N,N-dimethyl-N-(3-cocoamidopropyl)-N-(2-hydroxy-3-sulfopropyl)ammonium betaine, polyamines, 1H-imidazole-polymer with (chloromethyl)oxiran, 3-carboxy-1-(phenylmethyl)pyridinium chloride sodium salt, 1-benzyl-3-sodium carboxypyridinium chloride, arsenic trioxide, potassium antimony tartrate, potassium tellurate, alkali arsenite, potassium tellerite, potassium seleno cyanate, alkali antimonyl tartrate, (Continued)

sodium selenite, thallium sulfate, and carbon disulfide, to create the outer surface of the contact that is at least an order of magnitude rougher than a surface of a conventionally-fabricated contact.

16 Claims, 2 Drawing Sheets

(51) Int. Cl.
*H02K 13/00* (2006.01)
*H02K 13/02* (2006.01)
*B32B 15/04* (2006.01)

(56) References Cited

U.S. PATENT DOCUMENTS

| | | | | |
|---|---|---|---|---|
| 4,398,113 | A | | 8/1983 | Lewis et al. |
| 4,624,857 | A | * | 11/1986 | Dahms ................ G01N 27/42 |
| | | | | 205/81 |
| 4,724,052 | A | * | 2/1988 | Nidola ................ C25B 11/0478 |
| | | | | 205/109 |
| 2003/0135981 | A1 | | 7/2003 | Galyean |
| 2007/0228567 | A1 | * | 10/2007 | Bauer ................ H01L 23/3142 |
| | | | | 257/739 |
| 2010/0144079 | A1 | * | 6/2010 | Mayer ................ C25D 5/024 |
| | | | | 438/57 |
| 2013/0143071 | A1 | * | 6/2013 | Kleinle ............... C23C 18/1637 |
| | | | | 428/658 |
| 2014/0038434 | A1 | * | 2/2014 | Winkler ............... H01R 39/24 |
| | | | | 439/29 |
| 2015/0068908 | A1 | * | 3/2015 | Gay .................... C25D 3/56 |
| | | | | 205/50 |

FOREIGN PATENT DOCUMENTS

| | | | |
|---|---|---|---|
| JP | H03223486 A | 10/1991 | |
| WO | WO-2013150028 A1 * | 10/2013 | ............... C25D 3/56 |

* cited by examiner

SLIPRING WITH REDUCED CONTACT NOISE

CROSS-REFERENCE TO RELATED APPLICATIONS

This patent application claims priority from and benefit of the European Patent Application No. 16172022.2, filed on May 30, 2016, the entire disclosure of which is incorporated by reference herein.

TECHNICAL FIELD

The invention relates to manufacture of a gold-plated slipring contact, a sliding contact and a galvanic bath.

RELATED ART

U.S. Pat. No. 4,398,113 discloses a slipring assembly showing a common slipring contact.

In related art, it is known to manufacture slipring contacts as follows: On a mechanically treated substrate material containing copper, the following layers are applied subsequently: a copper layer (typically with a thickness from 0.1 µm up to 4 µm) as activating layer; if needed, a nickel and/or nickel phosphor layer (each with a corresponding thickness from 1 µm to 10 µm) as diffusion barrier, support and corrosion layer; and a hard gold layer (with a thickness from 1 µm to 15 µm) as contact material.

SUMMARY

Implementations of this invention are configured to improve the electrical performance (and, in particular, noise performance) of a slipring contact. Solutions directed to such improvement(s) are provided by a sliding contact, a method for manufacture of a gold-plated slipring contact, and a galvanic bath for deposition of copper, as recited in the claims.

The method for manufacture of a gold-plated slipring contact includes the following steps: providing an electrically conductive substrate, galvanic application of a copper layer on the substrate, galvanic application of a nickel and/or nickel phosphor layer on the copper layer, and galvanic application of a gold layer on the nickel and/or nickel phosphor layer. Here, during the galvanic application of the copper layer on the substrate, at least one of the brighteners from the following list of brighteners is not used in the galvanic bath: 3-carboxy-1-(phenylmethyl)pyridinium chloride sodium salt, cationic polymers with urea groups, 1-(3-sulfopropyl)pyridinium betaine, 1-(2-hydroxy-3-sulfopropyl)-pyridinium betaine, propargyl (3-sulfopropyl)ether sodium salt, sodium saccharin, sodium allylsulfonate, N,N-dimethyl-N-(3-cocoamidopropyl)-N-(2-hydroxy-3-sulfopropyl)ammonium betaine, polyamines, 1H-imidazole-polymer with (chloromethyl)oxiran, 3-carboxy-1-(phenylmethyl)pyridinium chloride sodium salt, 1-benzyl-3-sodium carboxy-pyridinium chloride, arsenic trioxide, potassium antimony tartrate, potassium tellurate, alkali arsenite, potassium tellerite, potassium seleno cyanate, alkali antimonyl tartrate, sodium selenite, thallium sulfate, and carbon disulfide. Preferably, at least two brighteners from the above-identified list are not used during the galvanic application of the copper layer on the substrate in the galvanic bath. More preferably, no brightener at all is used in galvanic application of the copper layer on the substrate in the used galvanic bath.

BRIEF DESCRIPTION OF THE DRAWINGS

The invention is further described based on examples and/or embodiments that do not limit the general idea of the invention, and with reference to the following drawings.

During the galvanic application of the copper layer 12 on the substrate 10, preferably an electrolyte based on potassium copper cyanide is used as a galvanic bath. Preferably, the copper layer 12 is applied on the substrate with a layer thickness of up to 4 µm. In a particularly preferred embodiment, the copper layer 12 is a copper layer with a layer thickness of up to 10 µm.

Figure 1:
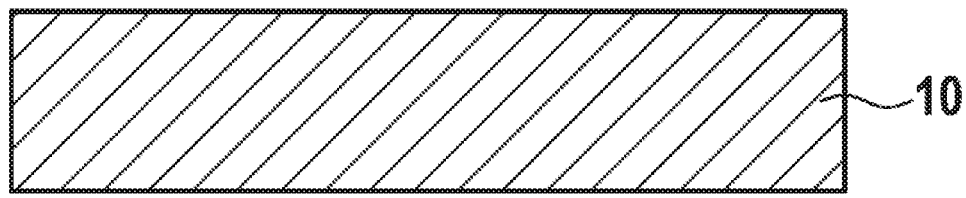
FIG. 1 shows the first step of the inventive method for manufacture of a gold-plated slipring contact. Here, the provided substrate 10 is preferably made of brass or of another copper-based alloy.
Figure 2:
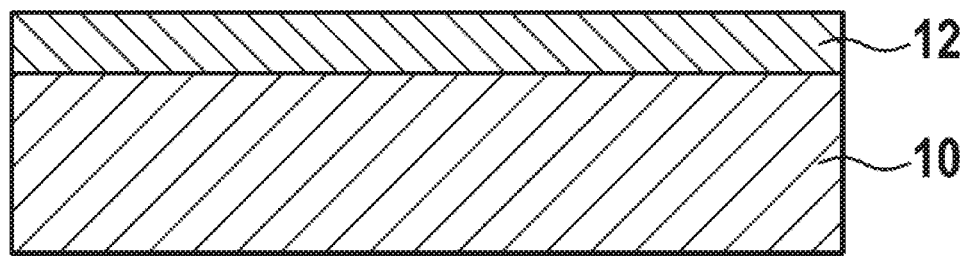
FIG. 2 shows the second step of the inventive method for manufacture of a gold-plated slipring contact. Here, a copper layer 12 is galvanically applied on/to the substrate 10.
Figure 3:
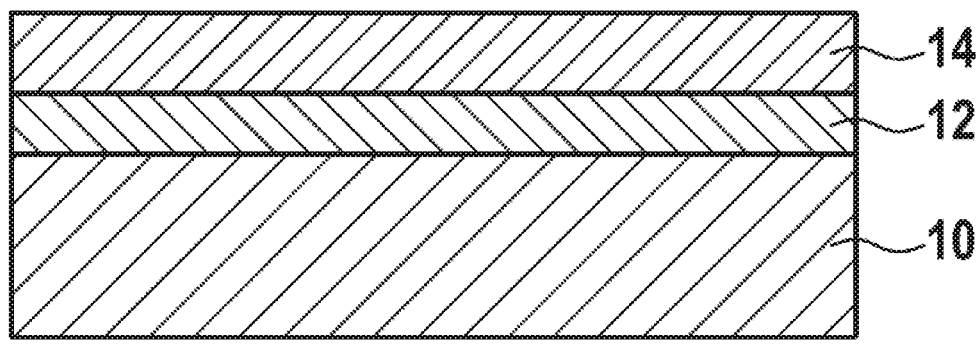

FIG. 3 shows the third step of the inventive method for manufacture of a gold-plated slipring contact. Here, a nickel and/or nickel phosphor layer 14 is galvanically applied on/to the copper layer 12. Preferably, the nickel and/or nickel phosphor layer 14 is applied with a thickness between 5 and 10 µm.

Figure 4:
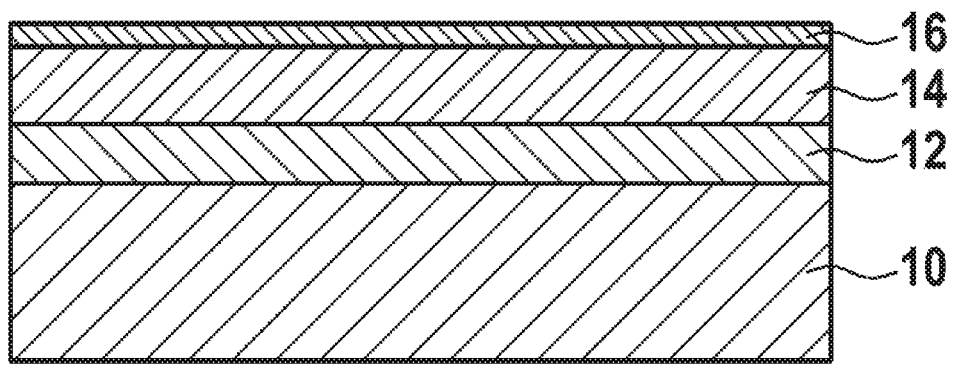

FIG. 4 shows the fourth and last step of the inventive method for manufacture of a gold-plated slipring contact. Here, a gold layer 16 is galvanically applied on the nickel and/or nickel phosphor layer 14. Preferably, the gold layer 16 is applied with a thickness between 3 and 9 µm, and in a specific case—of 6 µm. FIG. 4 also shows a sliding contact fabricated with the method of the invention and containing the above-described layer sequence on the substrate 10. Such sliding contact has a substantially rougher surface as compared to the sliding contact of related art.

DETAILED DESCRIPTION

The method for manufacture of a gold-plated slipring contact includes the following steps: providing an electrically conductive substrate, galvanic application of a copper layer on the substrate, galvanic application of a nickel and/or nickel phosphor layer on the copper layer, and galvanic application of a gold layer on the nickel and/or nickel phosphor layer. Here, during the galvanic application of the copper layer on the substrate, at least one of the brighteners from the following list of brighteners is not used in the galvanic bath: 3-carboxy-1-(phenylmethyl)pyridinium chloride sodium salt, cationic polymers with urea groups, 1-(3-sulfopropyl)pyridinium betaine, 1-(2-hydroxy-3-sulfopropyl)-pyridinium betaine, propargyl (3-sulfopropyl)ether sodium salt, sodium saccharin, sodium allylsulfonate, N,N-dimethyl-N-(3-cocoamidopropyl)-N-(2-hydroxy-3-sulfopropyl)ammonium betaine, polyamines, 1H-imidazole-polymer with (chloromethyl)oxiran, 3-carboxy-1-(phenylmethyl)pyridinium chloride sodium salt, 1-benzyl-3-sodium carboxy-pyridinium chloride, arsenic trioxide, potassium antimony tartrate, potassium tellurate, alkali arsenite, potassium tellerite, potassium seleno cyanate, alkali antimonyl tartrate, sodium selenite, thallium sulfate, and carbon disulfide. Preferably, at least two brighteners from the above-identified list are not used during the galvanic application of the copper layer on the substrate in the galvanic bath. More preferably, no brightener at all is used in galvanic application of the copper layer on the substrate in the used galvanic bath.

The so-fabricated sliding contacts provide an electrical connection between moving parts. Here, such a sliding contact can be used as a stationary part or as a moving part. Such a sliding contact may also be used as a stationary part or as a moving part of a sliding module. For example, such a sliding contact can also be used as a brush or as a sliding track.

As a result of not using certain brighteners during the fabrication of the sliding contact elements, as disclosed above, the copper layer applied on the substrate (that comprises preferably brass) exhibits a higher roughness as compared to that typical for contact elements of the prior art. To characterize the layer roughness, Sa- or Sq-values according to EN ISO 25178 may be used. The Sq-value is the effective value or the root mean square of the surface's height profile. The Sa-value is a mean value of the absolute values of the surface's height profile. Typical Sa- or Sq-values achieved with the use of copper baths containing the above-itemized brightener(s) of prior art are in the range from 10 to 50 nm. In contradistinction with the related art, and when using the baths as described in the invention, the layer roughness of the deposited copper layer is increased to that corresponding to Sa- and/or Sq-values ranging from 200 nm to 1 μm (that is, the roughness is increased in some cases between 4 and 100 times). With further continued deposition, a certain leveling of these values may occur, depending on the used intermediate layer and final layer. However, the Sa- or Sq-values of the inventive final layer are at least 5- to 20-times higher (generally, an order of magnitude higher) as compared to those of the common final layers, and thus sliding contact element fabricated with the method of the invention are generally about an order of magnitude (5- to 20 times) rougher than sliding contact elements fabricated with the use of the above-itemized brighteners. Not only the related art is not aware of how to obtain the comparable values of Sa- and/or Sq-values for the sliding contact elements while conventionally fabricating the contact element with the use of those brighteners expressly excluded from the galvanic bath according to the idea of the invention, the methodology of such exclusion has not been discussed or suggested by related art regardless of the final result.

The values summarized in the table below have been empirically determined as mean values of a sample series (over 10 repeated tests).

TABLE

Typical Sa- or Sq-values for standard copper layers and inventive copper layers as well as standard final layers and inventive final layers (example copper; nickel and/or nickel phosphor; gold systems).

| Layer | Sa (nm) | increase Sa (x-factor) | Sq (nm) | increase Sq (x-factor) |
|---|---|---|---|---|
| copper (technical standard) | 23 | | 28 | |
| copper (invention) | 320 | 14 | 432 | 16 |
| Final layer (technical standard) | 23 | | 28 | |
| Final layer (invention) | 380 | 17 | 497 | 18 |

After the subsequent galvanic deposition of a nickel and/or nickel phosphor layer on the copper layer and a gold layer on the on the nickel and/or nickel phosphor layer, the increased roughness of the copper layer causes an increased roughness of a gold layer, which gold layer is decisive for the electrical performance. The roughness of the layer applied on the substrate (i.e., here the copper layer) is decisive for the roughness of the top layer. In other words, the roughness of the copper layer propagates through several galvanically applied layers until the top layer.

A gold layer manufactured in this way demonstrates improved electrical characteristics when compared to those of common sliding contacts, and, in particular, reduced contact noise. Accordingly, an overall sliding contact also shows these improved electrical characteristics, and, in particular, reduced contact noise. The improvement of electrical characteristics was demonstrates with spring wire tests performed by the Applicant. A method for layer build-up, as described, with a rough gold layer on top may be used either on the brush (or, respectively, the brush wires) or on the sliding track, or on both the brush (or, respectively, brush wires) and the sliding track. In a typical test setting, the electrical noise values (measured, for example, as a 90% percentile of the peak-peak-noise-value over 5 rotations over life time) typically differ from those characterizing common sliding contact at least by a factor of 2.

Preferably, a pure copper cyanide solution is used as galvanic bath during the galvanic application of the copper layer on the substrate. Alternatively, copper sulfate (copper vitriol), sodium copper cyanide or potassium copper cyanide may be used.

Preferably, the copper layer is applied on the substrate with a layer thickness of up to 4 μm. In a particularly preferred embodiment, the copper layer has a layer thickness of up to 10 μm.

Preferably, during the galvanic application of the nickel and/or nickel phosphor layer on the copper layer, the nickel and/or nickel phosphor layer is applied with a layer thickness of between 5 and 10 μm.

Preferably, during the galvanic application of the gold layer on the nickel and/or nickel phosphor layer, the gold layer is applied with a layer thickness of between 3 and 9 μm, and preferably of 6 μm.

A slipring contact fabricated with the use of disclosed method for manufacture of a gold-plated slipring contact, includes the following layer sequence: an electrically conductive substrate, a copper layer on the substrate, a nickel and/or nickel phosphor layer on the copper layer, and a gold layer on the nickel and/or nickel phosphor layer. The substrate preferably comprises brass. It is further preferred, if the substrate includes only brass. This slipring contact, which may for example, be attached to a brush or on a sliding track, is characterized by improved electrical properties, as already mentioned above.

During the galvanic deposition of copper according to the above-mentioned method, a galvanic bath for deposition of copper is used. Such galvanic bath does not include at least one brightener from the following group of brighteners: 3-carboxy-1-(phenylmethyl)pyridinium chloride sodium salt, cationic polymers with urea groups, 1-(3-sulfopropyl) pyridinium betaine, 1-(2-hydroxy-3-sulfopropyl)-pyridinium betaine, propargyl(3-sulfopropyl)ether sodium salt, sodium saccharin, sodium allylsulfonate, N,N-dimethyl-N-(3-cocoamidopropyl)-N-(2-hydroxy-3-sulfopropyl)ammonium betaine, polyamines, 1H-imidazole-polymer with (chloromethyl)oxiran, 3-carboxy-1-(phenylmethyl)pyridinium chloride sodium salt, 1-benzyl-3-sodium carboxy-pyridinium chloride, arsenic trioxide, potassium antimony tartrate, potassium tellurate, alkali arsenite, potassium tellerite, potassium seleno cyanate, alkali antimonyl tartrate, sodium selenite, thallium sulfate, and carbon disulfide. In other words, the galvanic bath does not contain (is devoid of) at least one of the above-identified brighteners. In a specific preferred implementation, no brightener from the above-mentioned list is used in the galvanic bath at all.

LIST OF REFERENCE NUMERALS 10 substrate
12 copper layer
14 nickel and/or nickel phosphor layer
16 gold layer

The invention claimed is:

1. A method for manufacture of a gold-plated slipring contact, the method comprising:
    forming a first layer of copper by galvanically applying copper on an electrically-conductive substrate;
    subsequently to said forming the first layer, creating a second layer of at least one of nickel and nickel phosphor by galvanically applying at least one of a layer of nickel and a layer of nickel phosphor on the first layer of copper; and
    subsequently to said creating the second layer, forming a third layer of gold by galvanically applying gold on said at least one of (i) the layer of nickel and (ii) the layer of nickel phosphor;
    wherein said galvanically applying copper is devoid of using, in the employed first galvanic bath, at least one brightener from the group of brighteners consisting of: 3-carboxy-1-(phenylmethyl)pyridinium chloride sodium salt, cationic polymers with urea groups, 1-(3-sulfopropyl)pyridinium betaine, 1-(2-hydroxy-3-sulfopropyl)-pyridinium betaine, propargyl(3-sulfopropyl) ether sodium salt, sodium saccharin, sodium allylsulfonate, N,N-dimethyl-N-(3-cocoamidopropyl)-N-(2-hydroxy-3-sulfopropyl)ammonium betaine, polyamines, 1H-imidazole-polymer with (chloromethyl)oxiran, 3-carboxy-1-(phenylmethyl)pyridinium chloride sodium salt, 1-benzyl-3-sodium carboxy-pyridinium chloride, arsenic trioxide, potassium antimony tartrate, potassium tellurate, alkali arsenite, potassium tellerite, potassium seleno cyanate, alkali antimonyl tartrate, sodium selenite, thallium sulfate, and carbon disulfide.

2. A method according to claim 1, wherein during said galvanically applying copper, no brightener from said group is used in an employed galvanic bath.

3. A method according to claim 1, wherein during said galvanically applying copper, a pure copper cyanide solution is used as an employed galvanic bath.

4. A method according to claim 2, wherein said galvanically applying copper includes using a pure copper cyanide solution as said employed galvanic bath.

5. A method according to claim 1, wherein said galvanically applying copper includes galvanically applying copper with a first layer thickness of up to 4 μm.

6. A method according to claim 1, wherein said galvanically applying copper includes galvanically applying copper with a first layer thickness of up to 10 μm.

7. (Curently amended) A method according to claim 1, wherein said galvanically applying the at least one of (i) the layer of nickel and (ii) the layer of nickel phosphor on the first layer of copper includes galvanically applying said at least one of the layer of nickel and the layer of nickel phosphor with a second layer thickness between 5μm and 10 p.m.

8. A method according to claim 1, wherein said galvanically applying gold on the at least one of the layer of nickel and the layer of nickel phosphor includes galvanically applying gold with a third layer thickness between 3 μm and 9 μm.

9. A method according to claim 1, wherein said galvanically applying gold on the at least one of (i) the layer of nickel and (ii) the layer of nickel phosphor includes galvanically applying gold with a third layer thickness of 6 μm.

10. A method according to claim 1, wherein at least one of the following conditions is satisfied:
    a) said galvanically applying copper includes causing the first layer of copper to have a surface roughness characterized by at least one of Sa-value and Sq-value that is in a range from 200 nm to 1 μm as a result of lack of said at least one brightener in the first galvanic bath, wherein said at least one of Sa-value and Sq-value is measured according to an EN ISO 25178 standard on Geometric Product Specifications enacted by the International Organization for Standardization (ISO); and
    b) said galvanically applying the layer of gold includes galvanically applying gold to form an outer surface of the contact with a surface roughness represented by at least one of Sa-value and Sq-value that is between 50 nm and 1,000 nm, wherein said at least one of Sa-value and Sq-value is measured according to the EN ISO 25178 standard.

11. A method for manufacture of a gold-plated slipring contact, the method comprising:
    providing an electrically conductive substrate made of brass;
    sequentially depositing a first layer of copper, a second layer of at least one of a layer of nickel and a layer of nickel phosphor, and a third layer of gold by:
        galvanically applying copper on an electrically-conductive substrate by using a first electrolyte based on potassium cyanide to form said first layer;
        galvanically applying at least one of the layer of nickel and the layer of nickel phosphor on the first layer of copper by using a second electrolyte to form said second layer; and
        galvanically applying gold on said at least one of (i) the layer of nickel and (ii) the layer of nickel phosphor to form said third layer.

12. A method according to claim 11, wherein said applying copper on the substrate includes applying copper with a first layer thickness of up to 4 μm.

13. A method according to claim 11, wherein said applying copper on the substrate includes applying copper with a first layer thickness of up to 10 μm.

14. A method according to claim 11, wherein said applying the at least one of the layer of nickel and the layer of nickel phosphor on the first layer of copper includes applying a layer with a second layer thickness between 5 μm and 10 μm.

15. A method according to claim 11, wherein said applying gold on the at least one of the layer of nickel and the layer of nickel phosphor includes applying gold with a thickness between 3 μm and 9 μm.

16. A method according to claim 11, wherein said applying gold on the at least one of the layer of nickel and the layer of nickel phosphor includes applying gold with a thickness of 6 μm.

* * * * *